ROSCOE G. ELDER.

Improvement in Handles for Children's Carriages.

No. 4,823. Reissued March 26, 1872.

Witnesses.
C. Wahlert.
Ernst Bilhuber.

Inventor.
Roscoe G. Elder
per
Van Santvoord & Hauff
attys

AM. PHOTO-LITHOGRAPHIC CO. N.Y. (OSBORNE'S PROCESS.)

UNITED STATES PATENT OFFICE.

ROSCOE G. ELDER, OF NEW YORK, N. Y.

IMPROVEMENT IN HANDLES FOR CHILDREN'S CARRIAGES.

Specification forming part of Letters Patent No. 99,420, dated February 1, 1870; reissue No. 4,823, dated March 26, 1872.

*To all whom it may concern:*

Be it known that I, ROSCOE G. ELDER, of the city, county, and State of New York, have invented a new and Improved Handle for Child's Carriage; and I do hereby declare the following to be a full, clear, and exact description thereof, which will enable those skilled in the art to make and use the same, reference being had to the accompanying drawing forming part of this specification, in which drawing—

Figure 1:
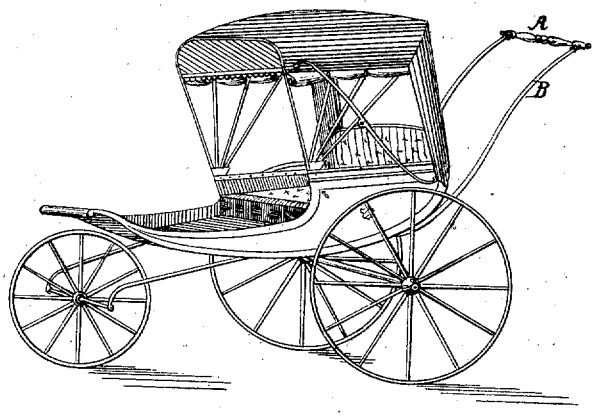
Figure 2:
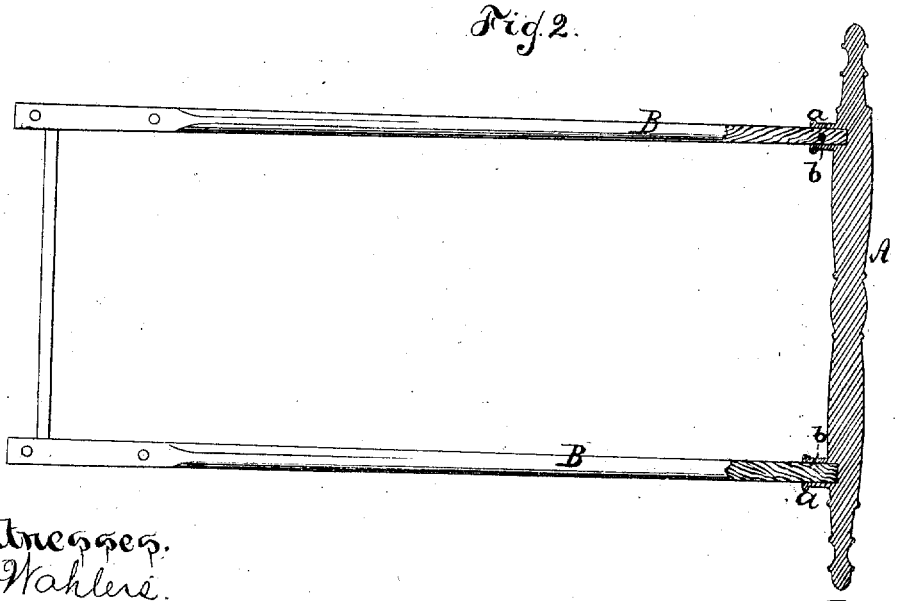

Figure 1 is a perspective view of this invention. Fig. 2 is a sectional plan of the same.

Similar letters indicate corresponding parts.

This invention consists in a handle-top for child's carriage, made either solid or hollow, in such a manner that a strong and durable article is obtained, the handle-top being so constructed, with hollow projections extending therefrom, that it can be readily and securely fastened to the shanks of the handle.

The handle-tops for children's carriages, according to the present style, are made of wood, painted or varnished, and said tops are fastened to the shanks of the handles by boring holes in them and inserting the shanks. These holes, from the nature of the article, can only be of limited depth, and the tops are liable to split or to come off; and, furthermore, the paint or varnish of the wooden tops is liable to soil the hands, particularly in hot weather, when the carriage is most used; and, by frequent contact with the hands, such paint or varnish is liable to come off, and the carriage becomes defaced.

All these disadvantages are obviated by my invention, the body of my handle-top A being made of metal, either cast or otherwise, and either solid or hollow, as may be most desirable. I make the same, by preference, of metal which admits of being plated with silver, so that a fine polish can be given to said handle, and a handle is produced which is not liable to become soiled or tarnished by the contact of the hands in using the carriage. The handle-top A is provided with hollow projections *a*, forming sockets for the shanks B B, which are by this means connected with the handle-top. The manner here shown of providing the handle-top with the socket-pieces *a* is by forming them of one piece with the handle-top, as is represented in the drawing. The projections or socket-pieces *a* are bored out or otherwise made hollow to form sockets for the ends of the shanks B, which are inserted in the sockets and secured by fastenings *b*. By means of these projections sockets of increased depth are obtained, and the strength and durability of the handle are materially increased.

This construction enables the handle-top to be readily connected to the shanks B, so that the handle can be taken apart for shipping and firmly put together for use, while the ordinary wooden top must be glued to the shank so that it cannot be taken apart; and, furthermore, such wooden tops are constantly coming off, much to the annoyance of the owner and danger to the child when riding.

The handle-top constructed according to my improvement is not liable to come off; it is strong and durable; it can be made cheap; and it materially improves the durability and appearance of the carriage.

What I claim as new, and desire to secure by Letters Patent, is—

1. Handles for children's carriages, provided with a metallic top, A, substantially as shown and described.

2. I also claim the projecting sockets *a*, on the handle-tops of children's carriages, to receive the ends of the shanks of the handle, substantially as described.

ROSCOE G. ELDER.

Witnesses:

E. G. KASTENHUBER,
W. HAUFF.